United States Patent
Corvaglia et al.

(10) Patent No.: US 11,498,291 B2
(45) Date of Patent: Nov. 15, 2022

(54) METHOD AND TOOL FOR MANUFACTURING A COMPOSITE AIRCRAFT WINDOW FRAME

(71) Applicant: LEONARDO S.p.A., Rome (IT)

(72) Inventors: Stefano Giuseppe Corvaglia, Grottaglie (IT); Nicola Gallo, Grottaglie (IT); Silvio Pappadà, Grottaglie (IT); Umberto Raganato, Grottaglie (IT); Luca Lanzilotto, Grottaglie (IT); Michele Arganese, Grottaglie (IT)

(73) Assignee: LEONARDO S.P.A., Rome (IT)

(*) Notice: Subject to any disclaimer, the term of this patent is extended or adjusted under 35 U.S.C. 154(b) by 239 days.

(21) Appl. No.: 17/030,920

(22) Filed: Sep. 24, 2020

(65) Prior Publication Data
US 2021/0094248 A1   Apr. 1, 2021

(30) Foreign Application Priority Data

Sep. 27, 2019   (IT) .......................... 102019000017420

(51) Int. Cl.
*B29C 70/48* (2006.01)
*B29C 70/44* (2006.01)
(Continued)

(52) U.S. Cl.
CPC ........ *B29C 70/48* (2013.01); *B29C 45/14065* (2013.01); *B29C 45/2602* (2013.01);
(Continued)

(58) Field of Classification Search
CPC ....... B29C 70/48; B29C 70/20; B29C 70/443; B29C 45/14065; B29C 45/2602; B64F 5/10; B64C 1/1484; B29L 2031/3076
See application file for complete search history.

(56) References Cited

U.S. PATENT DOCUMENTS 5,023,041 A * 6/1991 Jones .................. B29C 33/0055
                                                    264/510
6,406,659 B1 * 6/2002 Lang ...................... B29C 43/12
                                                    264/102
(Continued)

FOREIGN PATENT DOCUMENTS

| CA | 2819121 A1 * | 9/2012 | ............ B29C 45/02 |
| DE | 102012110307 A1 | 4/2014 | |
| EP | 0332899 A2 | 9/1989 | |

OTHER PUBLICATIONS

Italian Search Report and Written Opinion issued by Ministero dello Sviluppo Economico for Italian Application No. IT201900017420, dated Jun. 9, 2020, pp. 1-7.

*Primary Examiner* — Robert B Davis
(74) *Attorney, Agent, or Firm* — The Belles Group, P.C.

(57) ABSTRACT

The invention relates to a method for manufacturing a composite aircraft window frame; the method comprises the steps of: a) positioning in a mold a preform made of pre-impregnated material including dispersed fibers, with a predefined orientation, in a thermosetting resin matrix; b) closing the mold so as to define a gap between at least one surface of said preform and a portion of said mold; c) injecting thermosetting resin into the closed mold through an inlet opening of the mold itself, so as to fill the gap and completely lap said surface of the preform; and d) applying a uniform hydrostatic pressure on the surface by the injection of the resin.

9 Claims, 4 Drawing Sheets

(51) Int. Cl.
*B29C 45/14* (2006.01)
*B64F 5/10* (2017.01)
*B29C 45/26* (2006.01)
*B29C 70/20* (2006.01)
*B64C 1/14* (2006.01)
*B29K 101/10* (2006.01)
*B29K 105/08* (2006.01)
*B29L 31/30* (2006.01)

(52) U.S. Cl.
CPC ............ *B29C 70/20* (2013.01); *B29C 70/443* (2013.01); *B64C 1/1484* (2013.01); *B64F 5/10* (2017.01); *B29K 2101/10* (2013.01); *B29K 2105/0881* (2013.01); *B29L 2031/3076* (2013.01)

(56) References Cited

U.S. PATENT DOCUMENTS

2007/0063393 A1* 3/2007 Vernin .................. B29C 70/443
425/504
2007/0182071 A1* 8/2007 Sekido ................ B29C 33/0066
425/546
2015/0283767 A1 10/2015 Renkl et al.
2016/0176085 A1 6/2016 Brok et al.

* cited by examiner

METHOD AND TOOL FOR MANUFACTURING A COMPOSITE AIRCRAFT WINDOW FRAME

CROSS-REFERENCE TO RELATED APPLICATIONS

This patent application claims priority from Italian patent application no. 102019000017420 filed on Sep. 27, 2019, the entire disclosure of which is incorporated herein by reference.

TECHNICAL SECTOR

The present invention relates to a method for manufacturing a composite aircraft window frame.

The present invention also relates to a tool for manufacturing a composite aircraft window frame.

BACKGROUND

Structural components, for example fuselages and parts thereof, made of composite material, used in the aviation field are known. The use of said material was dictated by the need to reduce the overall weight of aircraft and to eliminate or minimize the corrosion problems of aeronautical structures.

According to the state of the art, there are aeronautical structural elements that are produced in light alloy and, therefore, in metallic material, for example the window frames, or side windows, which must then be applied to the fuselage.

The use of said metallic elements and their assembly in contact with the composite structures cause problems of galvanic coupling with related risks of corrosion of the metal and the need to increase inspection levels. This leads to an increase in total costs for the producers of these components and, therefore, for the airlines.

Therefore, the need to make these structural elements also in composite material arises.

In this regard, the technique called "Resin Transfer Molding" (RTM) is known in the sector, which basically comprises the following steps:
  making a dry composite preform, for example by laminating two or more layers of material, usually fiber material, for example carbon fiber;
  positioning the preform in a suitably shaped injection mold so as to impart the desired shape to the frame;
  injecting the fluid resin into the mold under pressure, in order to infuse the preform with the resin itself and thus impregnate the fibers; and
  carrying out one or more cure cycles inside the mold, at high temperature and pressure.

At the end of the aforesaid process, the component thus obtained (i.e., the preform in fiber impregnated with the resin and cured) is demoulded, or extracted, from the mold ("demoulding" step).

The window frames made according to the process described above, while having numerous advantages (for example, low defects, high repeatability of the physical-mechanical performances) are not, however, free from drawbacks, some of which are highlighted below.

First, it is very complex to guarantee the original direction of the fibers of the dry preform after their infusion with the resin under pressure. This might result in very long post-forming process times.

Furthermore, a pre-compression step of the dry preform is always necessary before the resin injection, since the thickness of the dry preforms is always greater than the nominal thickness; this step can take a long time and is extremely dependent on the experience of specialized personnel.

In addition, the use of a dry preform implies a reduction in thickness during the process, which can lead to the formation of defects, with a consequent increase in waste.

The need is therefore felt in the sector to improve the manufacturing process of aircraft window frames made of composite material.

OBJECT AND SUMMARY OF THE INVENTION

The aim of the present invention is to provide a method for manufacturing a composite aircraft window frame, which is highly reliable and of limited cost, and which allows to overcome at least one of the drawbacks specified above and connected with the known methods for manufacturing composite aircraft window frames.

According to the invention, this aim is achieved by a method for manufacturing a composite aircraft window frame as claimed in claim 1.

A further aim of the present invention is to realise a tool for manufacturing a composite aircraft window frame, which is highly reliable and of limited cost, and which allows to obviate at least one of the drawbacks specified above and connected with the known tools for manufacturing aircraft window frames.

According to the invention, this aim is achieved by a tool for manufacturing a composite aircraft window frame as claimed in claim 7.

BRIEF DESCRIPTION OF THE DRAWINGS

For a better understanding of the present invention, a preferred non-limiting embodiment is described below, purely by way of example and with the aid of the attached drawings, in which.

DETAILED DESCRIPTION

Figure 1:
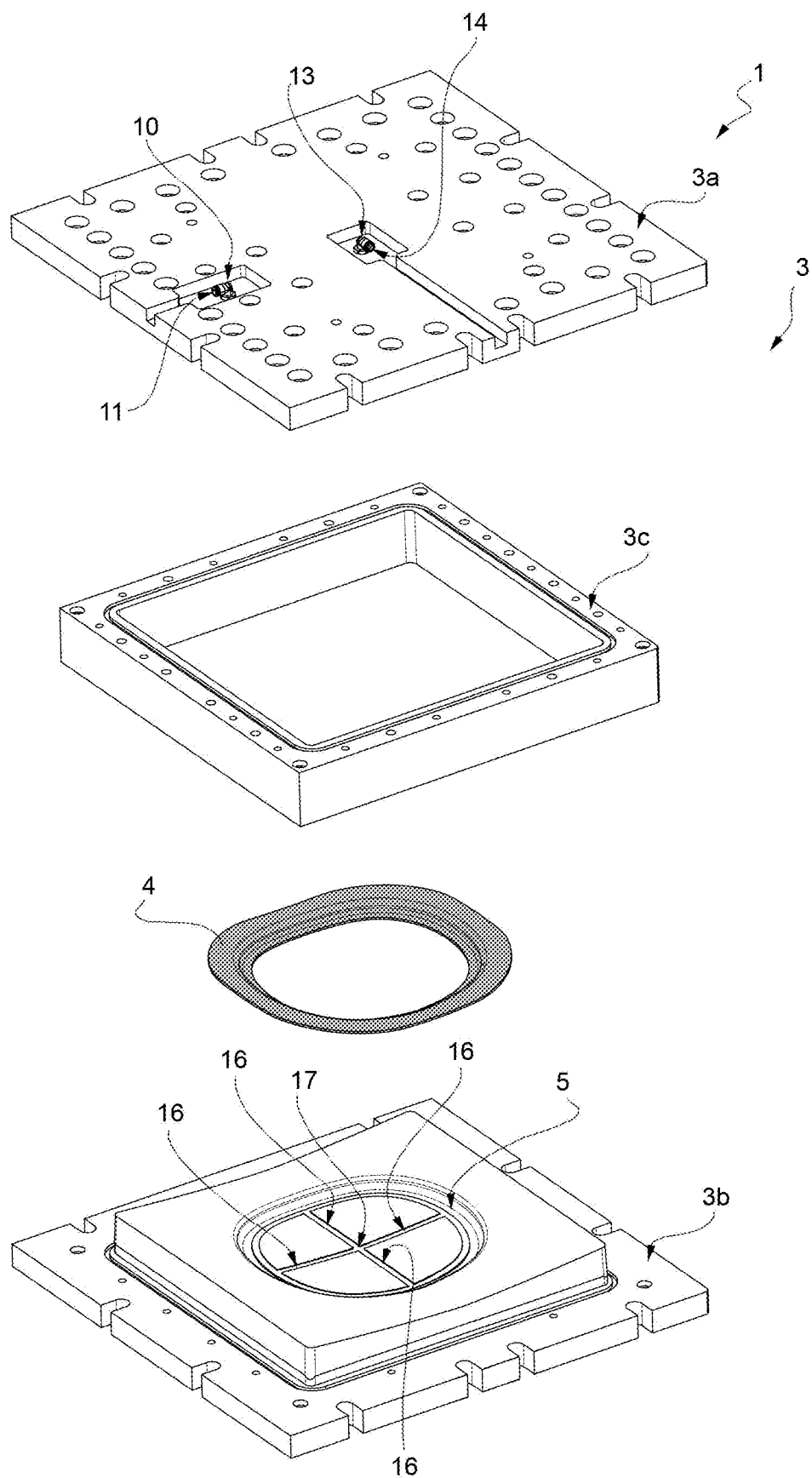
FIG. 1 is an exploded perspective view with parts removed for clarity of a tool according to the present invention for manufacturing an aircraft window frame starting from a preform.
Figure 2:
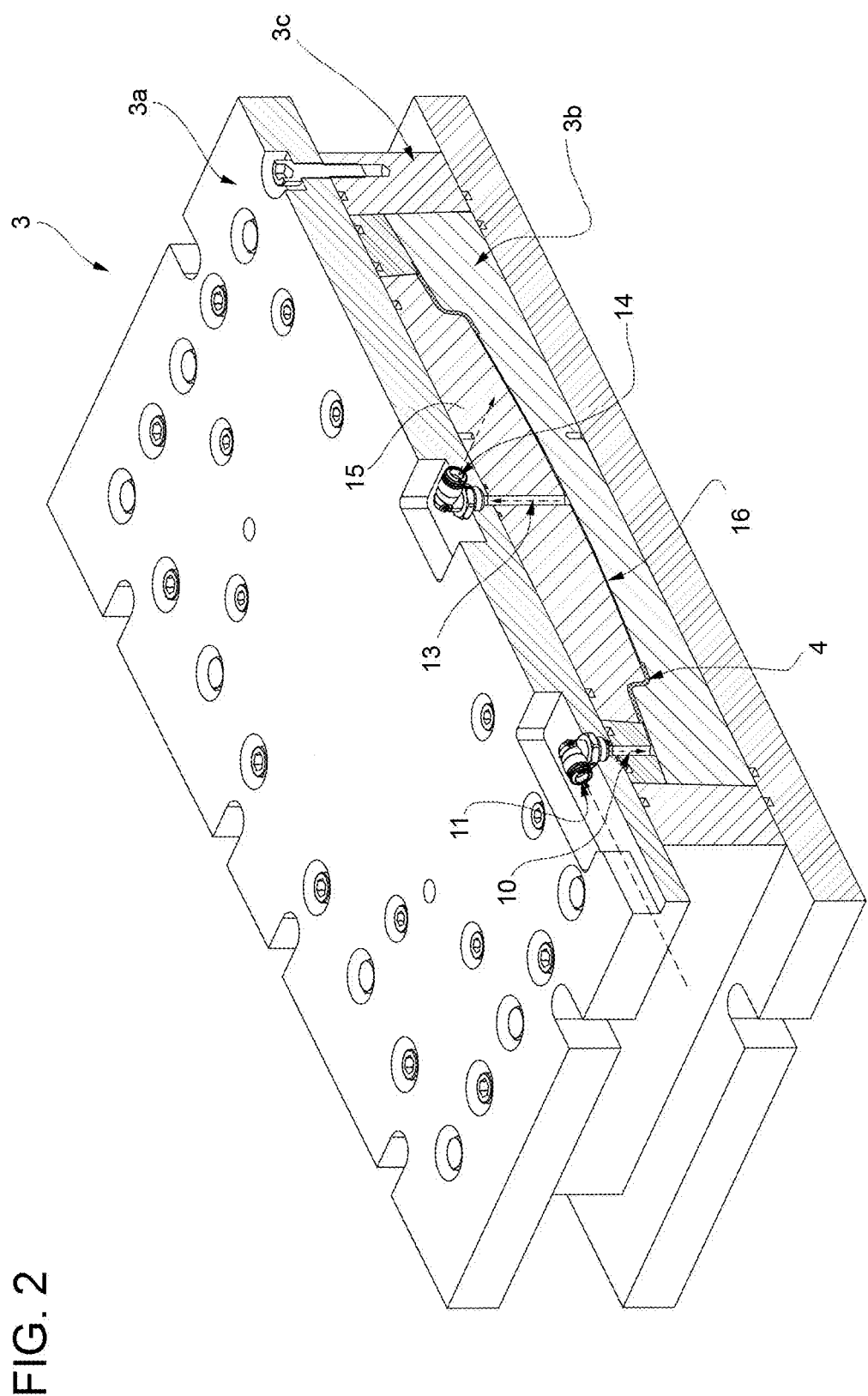
FIG. 2 is a perspective view, partially sectioned and on an enlarged scale, of the tool of FIG. 1 in the assembled configuration and with parts removed for clarity.

With reference to FIGS. 1 and 2, the numeral 1 indicates as a whole a tool for manufacturing a composite frame for a window, or side window, of an aircraft, for example an airplane.

The tool 1 comprises a mold 3.

It should be noted that terms such as "upper", "lower", or the like that will be used in the following refer to a reference system in which the vertical direction is defined by the direction of the force of gravity, without thereby losing generality.

The mold comprises at least: a first part, in particular an upper part 3a, a second part, in particular a lower part 3b, and a third part, in particular an intermediate part 3c, interposed, in use, between the lower part 3b and the upper part 3a.

The parts 3a, 3b, and 3c are configured to be closed, in use, around a preform 4 made of pre-impregnated material including dispersed fibers, with a predefined orientation, in a thermosetting resin matrix.

According to said preferred embodiment, the preform 4 has a substantially annular shape and defines the base component from which the window frame will be obtained, once the manufacturing method according to the present invention has been applied.

It should be noted that the term "annular" is used in the present description and in the claims to designate any closed frame element, with a curvilinear profile (for example circular, oval, elliptical and the like), polygonal in the strict sense or polygonal in the broad sense, that is with rounded vertices.

Preferably, the thermosetting resin is a toughened epoxy resin, for example Solvay 977 HM, or a resin with innovative properties, for example a resin added with nanofillers for conferring physical properties such as in particular a greater resistance to aging.

The lower part 3b comprises a shaped portion defining a peripheral annular compartment 5 configured to receive and support the preform 4.

In the illustrated example, the preform 4 has an "S" profiled cross section; therefore, the compartment 5 is conveniently shaped so as to be able to receive and house said preform 4.

According to a known process not described in detail, the preform 4 is obtained by laminating two or more layers (not illustrated) of the aforesaid material including fibers with a predefined orientation, for example carbon fibers, and by means of one or more successive consolidation steps of the aforesaid layers ("debulking") by applying vacuum.

The preform 4 thus obtained, of the type known as "prepreg", is positioned in the mold 3, in particular laid down and housed in the compartment 5 afforded in the lower part 3a.

In particular, the prepreg thus obtained has a weight in grams comprised between 150 and 250 g/m2, preferably 190 g/m2, is impregnated at a percentage by weight of a value comprised between 35% and 45%, preferably 40%, with the thermosetting resin matrix.

The final preform 4 has a nominal thickness comprised between 2.40 and 2.70 mm, preferably equal to 2.58 mm.

In the case illustrated, the preform 4 has a substantially constant thickness.

According to a possible alternative, not illustrated, the preform 4 could also have a variable thickness; possibly this variable thickness could be obtained with localized reinforcements.

Figure 3A:
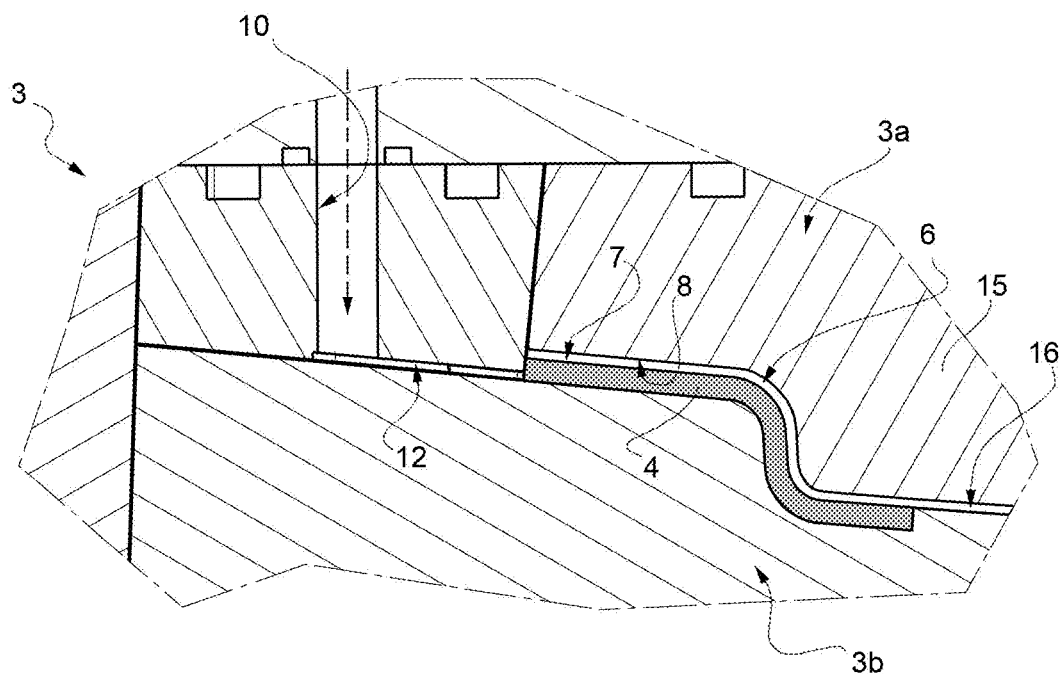
FIGS. 3a and 3b are section views, on an enlarged scale and with parts removed for clarity, of a detail of the tool of FIG. 2, during two different operating conditions.
Figure 3B:
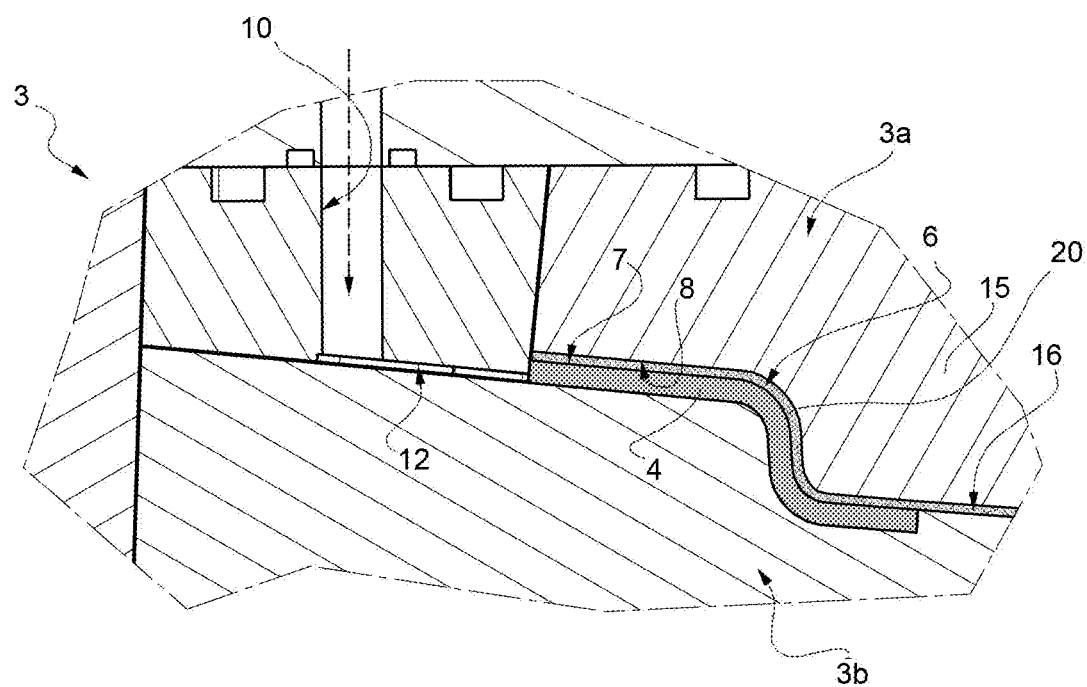

As shown in FIG. 2, once the preform 4 has been positioned in the compartment 5, the mold 3 is closed, so that a gap 6 is defined, in use, between an upper surface 7 of the preform 4 and an internal surface 8 of the upper part 3a facing the upper surface 7 (FIG. 3a).

More precisely, the upper part 3a has a shaped portion 15 in relief which reproduces and follows the "S" profile of the preform 4 and the compartment 5, when the mold 3 is closed, that is when the parts 3a, 3b and 3c are clamped and joined together.

In particular, the gap 6 has a substantially constant thickness, in the case illustrated comprised between 0.35 and 0.45 mm, preferably equal to 0.42 mm, and has a profile that reproduces and follows the "S" profile of the preform 4 and compartment 5.

Consequently, the gap 6 extends annularly and above the preform 4 and, therefore, the compartment 5.

Conventional means, such as for example screws or bolts (not illustrated), are provided for positioning, closing and clamping the various parts 3a, 3b and 3c of the mold 3.

The mold 3 comprises at least one inlet channel 10 arranged, that is afforded, in the upper part 3a, in particular in a peripheral portion of the upper part 3a, and configured to allow the passage of fluid inside the closed mold 3.

In greater detail, the inlet channel 10 is configured to allow the injection of thermosetting resin inside the closed mold 3, so as to fill the gap 6 and completely lap the upper surface 7 of the preform 4.

In this regard, as shown in FIGS. 1, 2, 3a and 3b, the inlet channel 10 comprises an inlet opening 11 through which the resin, in use, flows into the inlet channel 10 itself and then into the gap 6 through a passage 12.

In practice, in use, the resin flows from a suitable tank (not illustrated) towards the inside of the mold 3, through the inlet channel 10; from this, the resin flows into the passage 12 and, finally, from the passage 12 to the gap 6.

According to an alternative embodiment not illustrated, the mold 3 might comprise two or more inlet channels 10; the number and the position of the inlet channels 10 depends on the geometry of the component to be treated.

As can be seen in FIG. 2, the mold 3 also comprises an outlet channel 13, arranged, that is afforded, in the upper part 3a, in particular in a central portion of the upper part 3a, and configured to allow the passage of fluid from the inside of the mold 3 towards the outside of the mold 3 itself.

More precisely, the outlet channel 13 is configured to allow the exit of the resin, previously injected, outside the mold 3.

Figure 4A:
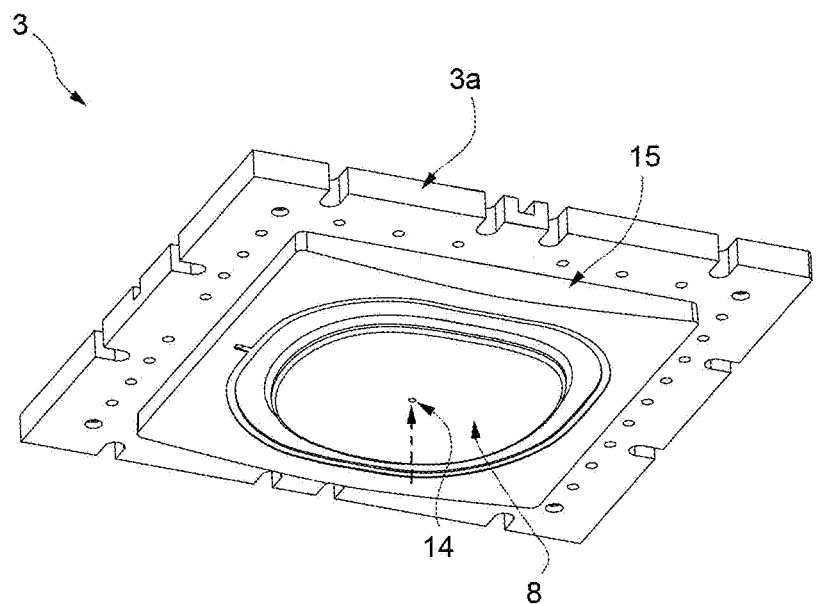
FIGS. 4a and 4b are perspective views on an enlarged scale, respectively from the bottom and from the top, of two different components of the tool of FIG. 1, with parts removed for clarity.

In detail, as soon as the resin has filled, in use, the entire gap 6, it is supplied to the outlet channel 13 and flows towards the outside of the mold 3 through an outlet opening 14 (FIG. 4a) of the outlet channel 13 itself.

In the example described, the injection of the resin takes place by sucking the resin inside the mold 3 by applying a vacuum inside the mold 3 itself.

In particular, the tool 1 comprises a vacuum source (known per se and not illustrated) configured to be fluidly connected, in use, with the outlet channel 13 and to apply the vacuum inside the mold 3, suitably sealed, so as to cause a suction that sucks the resin through the inlet channel 10.

The application of the vacuum helps to facilitate the flow of the resin in its path inside the mold 3 and towards the outlet channel 13.

Alternatively, the resin injection takes place by applying a positive thrust pressure, which forces the flow of the resin from the tank towards the inlet channel 10.

According to an alternative embodiment not illustrated, the mold 3 could comprise two or more outlet channels 13, where the number and the position of the outlet channels 13 depends on the geometry of the component to be treated.

Figure 4B:
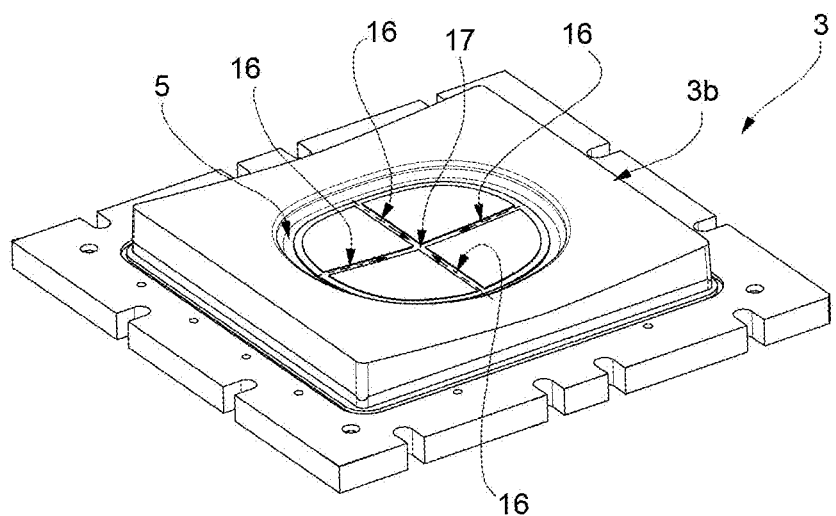

As can be seen in FIGS. 1 and 4b, the mold also comprises a number of intermediate channels 16 afforded in the lower portion 3b, fluidly interposed between the inlet channel 10 and the outlet channel 13 and configured to receive the resin in excess from the gap 6 and to supply such resin to the outlet channel 13.

In detail, the intermediate channels 16 are arranged so as to convey the resin from the gap 6 to a collecting portion 17 arranged upstream of the outlet channel 13 and at the aforesaid central portion of the upper part 3a.

In greater detail, the collecting portion 17 is arranged below the outlet channel 13, and is facing the latter.

According to said preferred and non-limiting embodiment, the mold 3 comprises four intermediate channels 16 arranged (i.e. distributed) symmetrically with respect to the collecting portion 17.

More precisely, the intermediate channels 16 are afforded in the lower portion 3b so as to form a cross with the arms mutually perpendicular and intersecting with one another at the collecting portion 17.

According to an alternative embodiment not illustrated, the intermediate channels could be arranged so as to form an X, the arms of which are transverse to each other but not orthogonal, are arranged symmetrically with respect to the collecting portion 17 and intersect one another at the collecting portion 17.

According to a further alternative embodiment not illustrated, the mold 3 could comprise more than four intermediate channels 16, arranged symmetrically with respect to the collecting portion 17 so as to form an asterisk and intersect one another at the collecting portion 17.

The symmetrical arrangement of the intermediate channels 16 allows a uniform evacuation of the resin from the mold 3 and consequently favours a uniform distribution of the flow of the resin flowing from the gap 6 to the outlet channel 13.

Preferably, the mold 3 further comprises heating means, in particular at least one electrical resistance conveniently included in the body of the mold 3, for example in the upper portion 3a, or in the lower portion 3b, or in both, and configured to be energized with current electric so as to heat the mold 3 by means of Joule effect.

This heating is exploited to carry out, in use, a cure or cocure cycle of the preform 4, after the latter has been consolidated according to the method described below.

Alternatively, the resistance can be included in the intermediate part 3c or in any combination of the parts 3a, 3b and 3c of the mold 3.

According to another possible alternative, not illustrated, the mold 3 could be heated with hot oil or other hot fluid circulating inside suitable ducts afforded in the mold 3 itself or by passive heating due to the contact of the mold 3 with not represented independent hot elements.

The process for manufacturing the window frame by means of the tool 1 according to the present invention will be described below, with particular reference to an initial condition in which the preform 4 is positioned in the compartment 5, the mold 3 is closed (according to the method described above) and the outlet channel 13 and, therefore, the outlet opening 14 are open.

In this condition, the gap 6 is well defined and delimited by the surface 7 of the preform 4 and by the surface 8 of the upper part 3a. Therefore, the resin is injected inside the mold 3, so as to fill the gap 6, to flow through the intermediate channels 16 and the outlet channel 13. The verification that the gap 6 has been completely filled up by the injected resin is provided by the resin exit from the outlet opening 13.

At this point, the outlet channel 13 and, therefore, the outlet opening 14 are sealed in a fluid-tight manner At the same time, the resin continues to be injected into the mold 3.

This step causes an increase in pressure inside the mold 3, in particular inside the gap 6, and the consequent application of a uniform hydrostatic pressure by the resin (more precisely through the continuous injection of the latter) on the upper surface 7 of the preform 4. Once the predetermined hydrostatic consolidation pressure is reached, for example 5 bar, the injection of the resin is stopped. In this condition, the resin does not further impregnate the preform 4, but merely laps the upper surface 7 thereof, applying the aforesaid hydrostatic pressure.

In practice, the step for applying the hydrostatic pressure is carried out by opening the outlet 14 which is sealed at the same time when the heat is applied, for example by means of the systems described above.

Thus, a cure or cocure cycle of the preform 4 in the mold 3 is carried out together with the injected resin present inside the mold 3 itself so as to achieve the consolidation of the material constituting the finished window frame.

After completing said cure or cocure cycle and an appropriate cooling cycle, carried out always by maintaining the consolidation hydrostatic pressure, the mold 3 is opened, i.e. the upper part 3a is separated from the lower part 3b, and the preform 4 is extracted from the mold 3 itself.

It should be noted that, at the end of the process, the layer 20 of thermosetting resin which fills the gap 6 and which is arranged in contact with the upper surface 7 remains in contact with the preform 4, becoming an integral part thereof, even after the extraction of the preform 4 itself, without however impregnating it.

The window frame, formed by the preform 4 made of pre-impregnated fibrous material and consolidated by hydrostatic pressure, and comprising the layer 20 of resin injected and consolidated on the surface 7, is thus obtained.

From an examination of the features of the method and of the tool 1 for manufacturing the aircraft window frame made according to the present invention, the advantages that it allows to obtain are evident.

In particular, the window frame obtained by the method and the tool according to the present invention maintains the orientation of the fibers of the preform 4, which, as specified above, are not impregnated in an uncontrolled manner during the injection of resin into the mold 3. This allows to guarantee the direction of the fibers of the preform 4.

Furthermore, the method described above allows to obtain frames with low levels of surface porosity and high aesthetic finish.

In addition, the window frames thus obtained do not require further processing.

It is clear that modifications and variations may be made to the method and to the tool 1 described and illustrated here without thereby departing from the scope of protection defined by the claims.

The invention claimed is:

1. A method for manufacturing a composite aircraft window frame; the method comprising the steps of:
   a) positioning in a mold a preform made of pre-impregnated material including dispersed fibers, with a pre-defined orientation, in a thermosetting resin matrix;
   b) closing the mold so as to define a gap between at least one surface of said preform and a portion of said mold;
   c) injecting thermosetting resin into the closed mold through an inlet opening of the mold itself, so as to fill said gap and completely lap said surface of the preform; and
   d) applying a uniform hydrostatic pressure on said surface by the injection of said resin.

2. The method as claimed in claim 1, wherein the step d) comprises the steps of:
   e) sealing the mold in a fluid-tight manner, with the exception of said inlet opening; and
   f) continuing to inject the resin through said inlet opening.

3. The method as claimed in claim 2, wherein the mold comprises an outlet opening through which the resin exits, in use, from the mold itself; and in which the step c) is carried out with the outlet opening opened and the step d) is carried out with the outlet opening sealed.

4. The method as claimed in claim 1, wherein, in steps c) and d), the thermosetting resin is injected onto said surface, without impregnating the preform.

5. The method as claimed in claim 1, wherein, in step c), the resin is sucked inside the mold by applying vacuum.

6. The method as claimed in claim 1, further comprising the step of supplying heat to the material present in said mold during the step d) so as to carry out a cure or cocure cycle at least of the preform.

7. A tool for manufacturing a composite aircraft window frame starting from a preform made of pre-impregnated material including dispersed fibers, with predefined orientation, in a thermosetting resin matrix;

said tool comprising a mold apt to house said preform and configured to be closed around said preform so that a gap is defined, in use, between a surface of said preform and an inner surface of said mold;

said mold comprising at least one inlet channel, configured to allow the injection of thermosetting resin into the closed mold, so as to completely lap said surface of said preform, to fill said gap and to apply a uniform hydrostatic pressure on said surface of said preform, and at least one outlet channel, configured to allow the exit of thermosetting resin from said mold;

wherein said mold further comprises intermediate channels fluidly interposed between said inlet channel and said outlet channel and configured to receive the resin in excess from said gap and to supply such resin to said output channel;

said intermediate channels being arranged so as to convey the resin to a collecting portion arranged upstream of said outlet channel relative to a direction of flow of the resin from the inlet channel to the outlet channel;

said intermediate channels being arranged symmetrically with respect to said collecting portion.

8. The tool as claimed in claim 7, wherein said intermediate channels are arranged so as to form a cross or an asterisk, intersecting with one another at said collecting portion.

9. The tool as claimed in claim 7, further comprising at least one electric resistance arranged in correspondence of said mold and configured to be energized with electric current so as to heat the mold by means of Joule effect.

* * * * *